(12) United States Patent
Aschenbrenner et al.

(10) Patent No.: US 7,990,577 B2
(45) Date of Patent: Aug. 2, 2011

(54) DYNAMIC EARLY PREPARATION OF PRESENTATION OBJECTS FOR EFFICIENT PRINTING

(75) Inventors: Jean M. Aschenbrenner, Boulder, CO (US); Reinhard H. Hohensee, Boulder, CO (US); David E. Stone, Longmont, CO (US); John T. Varga, Longmont, CO (US); Rose E. Visoski, Louisville, CO (US); Glenn Wardell, Fargo, ND (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 0 days.

(21) Appl. No.: 12/621,651

(22) Filed: Nov. 19, 2009

(65) Prior Publication Data

US 2010/0128292 A1 May 27, 2010

Related U.S. Application Data

(62) Division of application No. 10/763,618, filed on Jan. 23, 2004, now Pat. No. 7,663,772.

(51) Int. Cl.
*G06F 15/00* (2006.01)
*G06F 17/00* (2006.01)
(52) U.S. Cl. .................................... 358/1.9; 715/205
(58) Field of Classification Search .............. 358/1.15, 358/1.14, 1.13, 1.1, 1.9, 3.03, 3.06, 1.18, 358/1.17; 715/205, 234, 210, 243, 274, 249, 273, 255; 709/202, 206, 217, 219; 399/82, 364, 361
See application file for complete search history.

(56) References Cited

U.S. PATENT DOCUMENTS 6,295,133 B1 * 9/2001 Bloomquist et al. .......... 358/1.1
* cited by examiner

*Primary Examiner* — Saeid Ebrahimi Dehkordy
(74) *Attorney, Agent, or Firm* — Duft Bornsen & Fishman, LLP

(57) ABSTRACT

A command is provided as a means to instruct a printer to pre-rasterize and store presentation objects according to specified presentation parameters. The stored rasterized objects are available to the printer for use during printing when a print job is submitted to the printer which includes a presentation object already rasterized, saving significant processing at print time. The rasterized objects are stored with information identifying the object and the parameters used in the rasterization process and the printer is enabled to identify the appropriate rasterized object for inclusion in the print job. Objects may also be selected by a printer at print time as most closely matching the required parameters and then adjusted as needed at print time to completely conform with the requirements of inclusion in the job. This capability allows the printer to perform trimming-on-the-fly or other real-time operations while enjoying the time-saving benefits of a pre-rasterized object.

20 Claims, 5 Drawing Sheets

DYNAMIC EARLY PREPARATION OF PRESENTATION OBJECTS FOR EFFICIENT PRINTING

CROSS-REFERENCES TO RELATED APPLICATIONS

This non-provisional patent application is a divisional of U.S. patent application Ser. No. 10/763,618 filed Jan. 23, 2004, now U.S. Pat. No. 7,663,772 the disclosure of which is incorporated herein in its entirety for all purposes.

BACKGROUND OF THE INVENTION

The invention relates to the field of modern, high-feature printers and printing systems. More specifically, the invention relates to the efficient and flexible pre-processing and storage of presentation objects to allow faster print times.

Modern, computer-generated documents are often large, complex structures including many different images, photographs, charts and other types of presentation objects that can require significant time to print. Several different varieties of page description languages have been developed to describe to the printer the various features of these presentation objects, and other features of a document to be printed. In a typical configuration, a print server or printer controller is present in the printing system and is connected to the printer via some type of communication connection. The print server includes a print application that can be used to create documents and to select the document format, including the placement and use of the various presentation objects. These documents, and the accompanying formatting/printing information is passed to the printer by the print server via the communication connection and using the appropriate page description language.

As printer speeds continue to increase and as print data becomes more complex and more massive, performance tuning within the printer also becomes more important. Many modern printers require a user to preadjust and tune the print data being sent to a printer to ensure that the print data is processed efficiently by the printing system. However, there are many situation where it is impractical or impossible to pre-tune the data to improve performance. A few examples of such situations include:

color-image applications where images rotate or change size based on circumstances within the printed output (how and where items fit depending on variable text, etc.);

jobs that use presentation objects from a large collection; and jobs that re-print portions of data objects, requiring trimming on-the-fly.

What is needed in the art is a way to direct a printer to perform as much tuning, adjustment and pre-preparation of objects as possible before actual printing begins. This allows a trade-off of early preparation time for improved throughput at print time—when time is typically more critical.

SUMMARY OF THE INVENTION

The present invention improves over the existing art by having the printer pre-rasterize presentation objects at each orientation, size, trim, color fidelity combination, etc. that will later be used when the job is actually printed. Each such pre-rasterized object is then cached in a local memory for retrieval and use as needed when the document is printed.

In order to implement the invention, a new printer command, referred to as a preRIP command, is provided to allow a host program to direct the printer to pre-rasterize certain presentation objects at the combination of parameters that would be used if the object were rasterized while printing. Only, instead of printing the object, the preRIP command causes the prepared object to be cached for later use.

Doing the rasterization before printing starts requires extra processing time at the beginning of a print job, but increases the speed of printing because there is less to do at print time and presentation objects that are in the cache can potentially be reused multiple times without additional rasterization.

BRIEF DESCRIPTION OF THE DRAWINGS

Other objects and advantages of the invention will become apparent upon reading the following detailed description and upon reference to the accompanying drawings in which.

Figure 1:
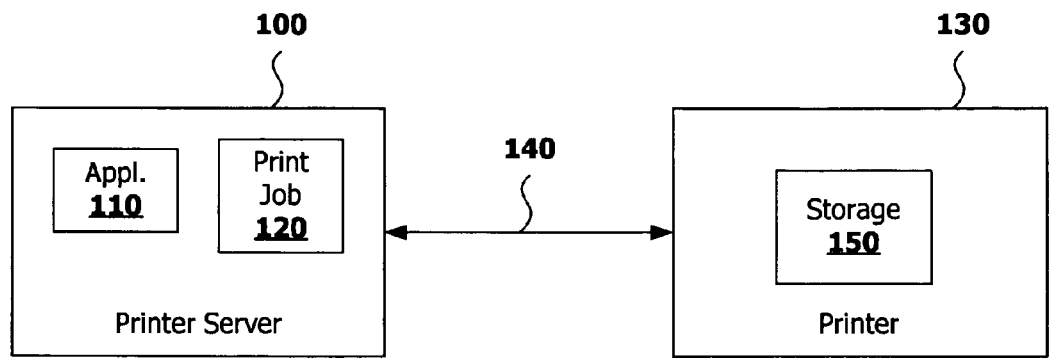
FIG. 1 is a block diagram of a printing system consistent with implementation of embodiments of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF EMBODIMENTS OF THE INVENTION

In accordance with embodiments of the present invention, and with reference to FIG. 1, a print server or printer controller 100 is provided with at least one application program 110 used to generate a print job 120. The print server 100 may be any type of computing device configured to control and communicate with a printer 130, including a general purpose server, a specialized print server, a personal computer, etc. The application program 110 may be any one of the many well known computer programs capable of creating a document to be printed and/or of creating a print job 120 containing instructions to a printer in an appropriate page description language for printing the document according to the user's formatting. Various such application programs and page description languages are available and are well known to those skilled in the relevant arts.

The print server 100 is connected to the printer 130 and communicates with the printer 130 over a communication link 140. Communication link 140 may be unidirectional (carrying information only from the print server 100 to the printer 130) or bidirectional (allowing the printer 130 to also send information to the print server 100). The print server 100 may send the print job 120 to the printer 130 when it is desired that the document(s) represented by print job 120 be printed. Printer 130 interprets the page description language of the print job 120 and produces printed output (not shown) in accordance therewith, all as is well known in the art. The component parts of print server 100 and printer 130 as well as the details relating to the communication link 140 are not described here in detail as they are not central to the present invention and may be assumed to be implemented in any known or later developed fashion consistent with this disclosure.

The printer 130 according to embodiments of the present invention also includes some type of local storage 150. The local storage may be of any type of electronic storage suitable for storage and retrieval of information to be used by the printer 130 during printing. Local storage 150 may be internal to printer 130 (as shown), external to printer 130 (not shown) or may even be remote from printer 130 such as storage connected to printer 130 via some type of network (not shown).

Figure 2:
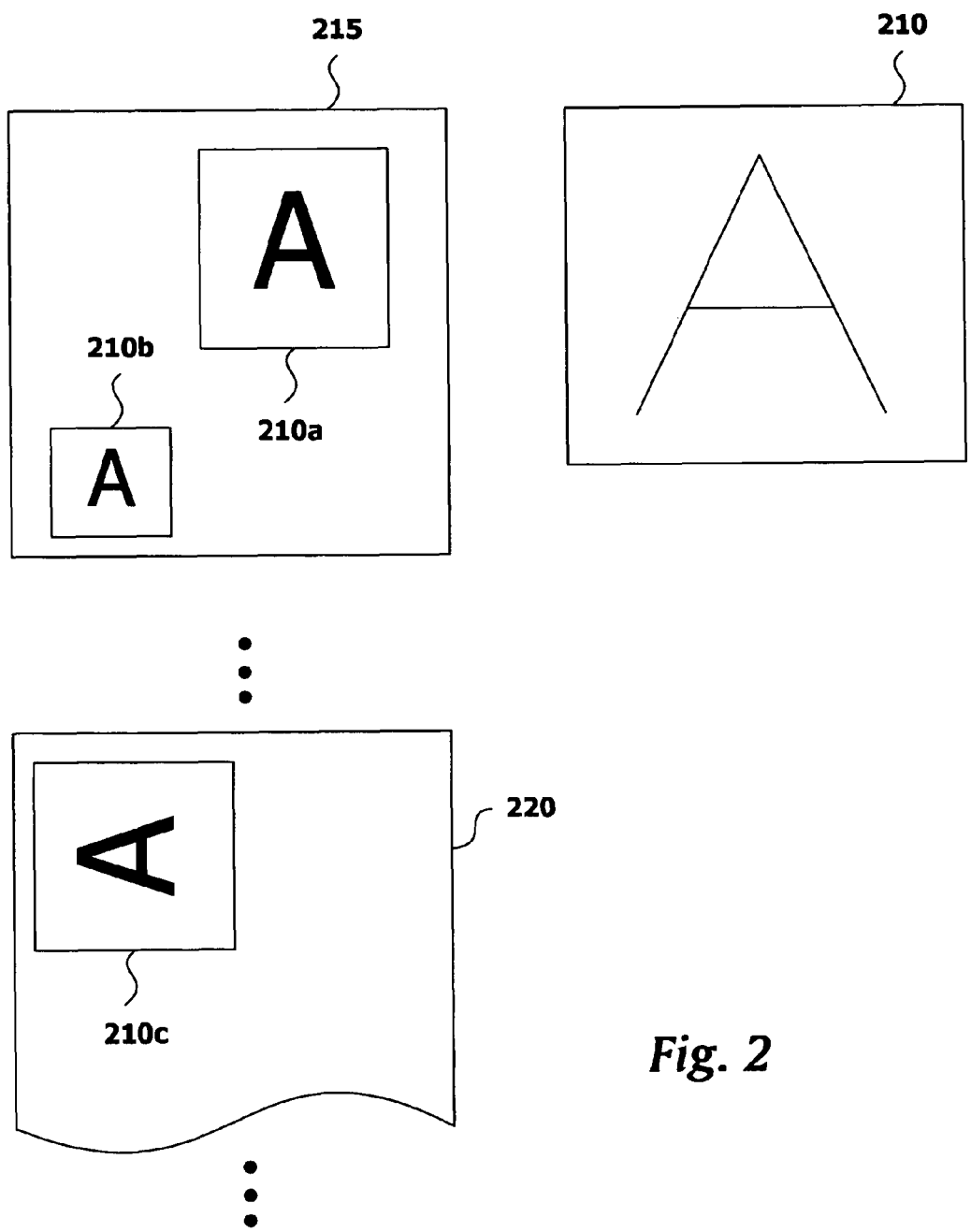
FIG. 2 is an illustration of an exemplary presentation object and the placement of the object within an exemplary document.

The application program 110 used to generate the print job 120 in the appropriate page description language for the printer 130, is, by definition, aware of the manner in which the various presentation objects are to be printed in the print file in question. For instance, with reference to FIG. 2, a particular document 200 included in a print job 120 of FIG. 1 may include as a presentation object a certain company logo 210. That logo may appear in, for example, three different places in the document. On the first page 215 of document 200, it may appear half-size 210*a* and one-quarter-size 210*b*. On a later page 220 of document 200 it may again appear half-size but rotated 90 degrees 210*c* (drawing not to scale).

The image sizing and rotation discussed above are referred to herein as presentation parameters and there are many other such parameters which may be applied to presentation objects. These parameters include things like printing in 'toner saver' mode where the image quality may be sacrificed for a savings in toner use, other color or image quality parameters, and various location, trimming and scaling options. Well-known trimming and scaling options include selections such as:

"scale-to-fit" where an object is scaled equally along the x and y axes in order to fit within a target space while maintaining the object's aspect ratio;

"scale-to-fill": where an object is scaled to fill the target space, regardless of the effect on aspect ratio;

"position" where an object is placed at any given position of a specified target space and any part of the object which falls outside the target space creates an error;

"position and trim" which is the same as 'position' except parts of the object falling outside the target area are trimmed off; and "center and trim" which is the same as 'position and trim' except the object is positioned at the center of the target space before trimming.

Many other parameters affecting the appearance, size and positioning of an object within a document exist or may be developed and are assumed to be well-known to those familiar with the relevant arts. The disclosed embodiments of the present invention are equally applicable to any and all of them.

Another print-related criteria that may be selected by a user is called error-blocking information. An error-blocking selection tells the printer what type of errors (such as position checks and undefined character checks) that can be ignored during printing. Errors that can be ignored are said to be 'blocked'. When unblocked errors occur during the pre-rasterization process in accordance with embodiments of the present invention, the rasterization is stopped and the object may be cached in its original, raw form. Rasterization will then take place at print time so that the error(s) can be properly reported. Specifying errors that can be ignored (or blocked) during pre-rasterization can significantly improve print-time performance.

The various presentation parameters discussed above may be expressed in association with an object in the page description language stream being sent to the printer 130 from the print server 100 over communication link 140 as appropriate according to the document in question. When operating according to embodiments of the present invention, the printer 130 recognizes each presentation object and each combination of presentation parameters applicable to it.

Figure 3:
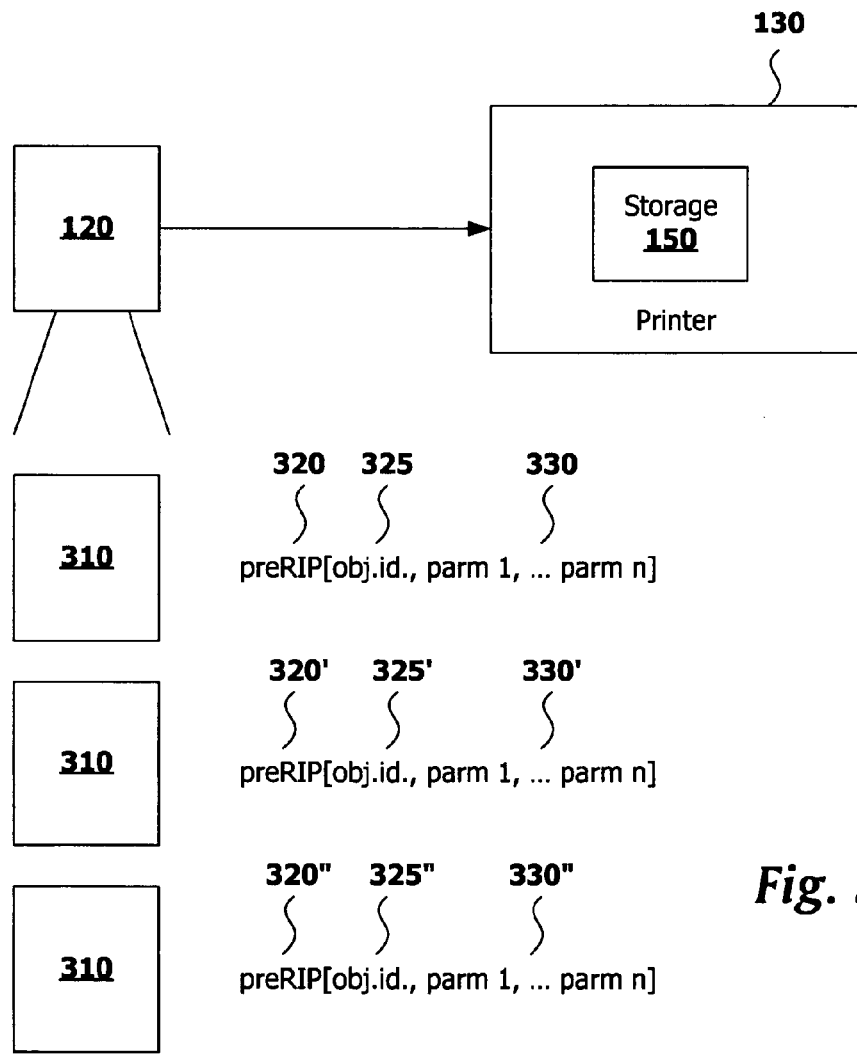
FIG. 3 is a representation of the transmission to a printer of a print job including exemplary preRIP commands according to an embodiment of the present invention.

Referring now to FIG. 3, the communication link 140 is represented as carrying a print job 120 including 3 presentation objects 310. Three objects are used for illustration purposes only and it is understood that any number of presentation objects may be present in a print job. When a print job is sent to printer 130 for printing, data representing each presentation object included in the print job may be sent with it, as shown. When one presentation object is to be included in a document multiple times with different presentation parameters, the data representing the object need only be sent to the printer one time—multiple preRIP commands could be created, each referring to the same object with different parameters. In alternative embodiments, some or all of the presentation objects may already be located in local storage 150 or in some other location accessible to the printer 130. In this alternative embodiment, presentation objects would be identified to the printer and the printer would retrieve the objects as needed.

In accordance with embodiments of the present invention, the print job 120 includes a preRIP command 320 for each version of each presentation object—that is, one preRIP command for each combination of presentation parameters for an object. Each preRIP command specifies an identifier 325 of the presentation object and the presentation parameters 330 associated with the respective instance of the presentation object. Presentation parameters 330 may include any number of individual parameters sufficient to describe the presentation requirements for the object according to the formatting of the document.

The preRIP commands may be sent to the printer at the beginning of the data stream containing the remainder of the print job to which they apply to allow the pre-rasterization in accordance with the presentation parameters to occur prior to the printing of the document(s) contained within the print job. Alternatively, the preRIP commands may be sent to the printer at any time before the print job is submitted to the printer so that objects may be rasterized and cached, waiting for a print job which calls for their inclusion. The user's selection of the types of errors that can be ignored may also be sent to the printer 130 with the print job 120 or at any time before a print job is submitted. Preferably, the printer 130 maintains the user's selection of blocked error types across print jobs until a new selection is submitted.

The disclosed embodiments of the present invention are described with reference to a new printer command referred to as a preRIP command. It is to be understood that this command is simply one way of implementing the broad concepts of the present invention and that the present invention is in no way limited to the use of a preRIP command or any other specifically named or formatted command. All that is required is that presentation objects and their associated parameters be identified to the printer and the printer instructed to rasterize and store them locally prior to printing as opposed to rasterizing them as the document is printed.

Figure 4:
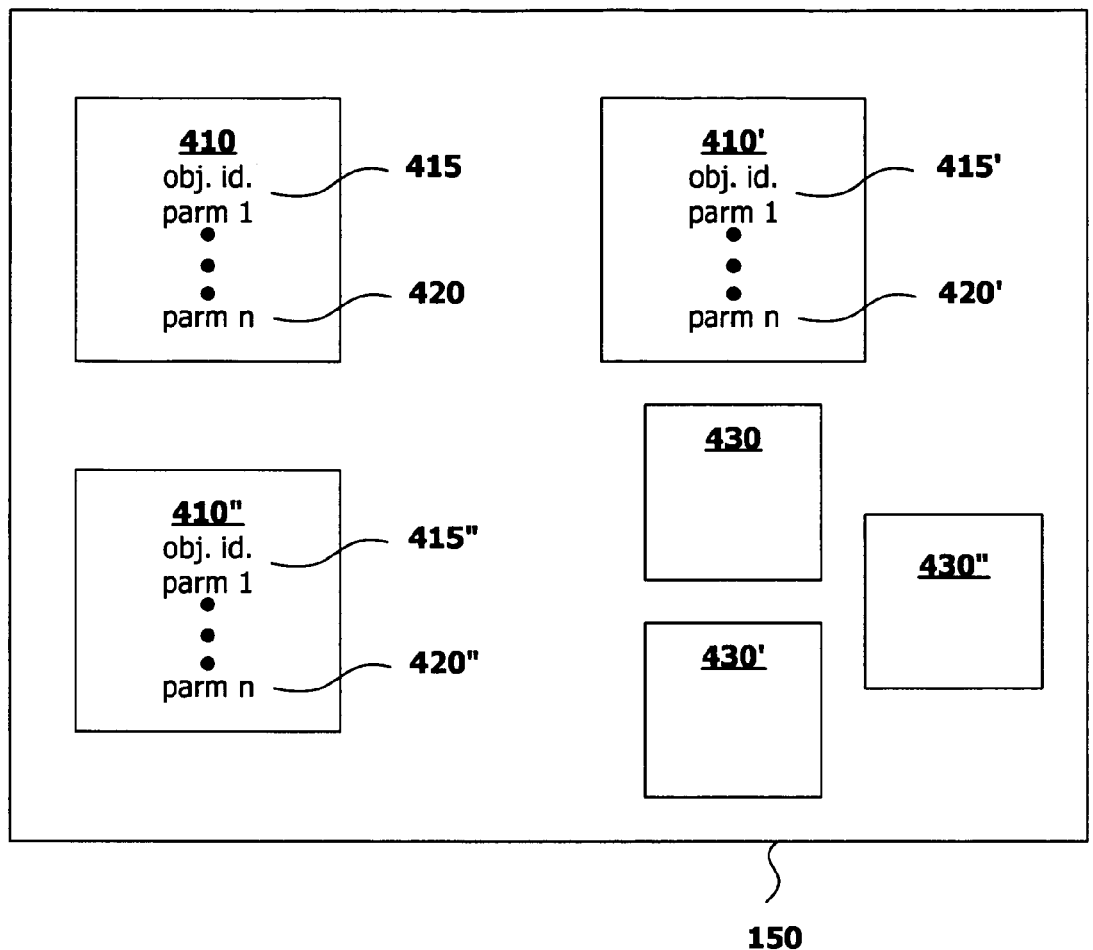
FIG. 4 is a representation of the storage of rasterized objects in a local storage according to embodiments of the present invention.

The printer 130 operating in accordance with embodiments of the present invention recognizes the preRIP commands 320 and rasterizes each object 310 identified 325 in a preRIP command 320 according to the defined presentation parameters 330 and stores the rasterized object in storage 150 for later use. When the prepared object is cached in storage 150, it is stored with a set of identifying tags so that it can be found when it is needed. These tags include an object identification tag and a tag representing each of the presentation parameters used in its preparation. Using the preRIP commands 320 and objects 310 from FIG. 3 as an example and referring now to FIG. 4, the printer 130 rasterizes objects 310 in accordance with the parameters 330 and caches each rasterized object 410 in storage 150 with identification and parameter tags as shown.

The processing of the first preRIP command 320 by printer 130 results in rasterized object 410 cached in local storage 150 with an object identifier 415 and a parameter list 420. Similarly, the processing of subsequent preRIP commands 320' and 320" results in the creation and storage of rasterized objects 410' and 410". The objects illustrated here as an example may some or all be the same object with different parameters (like the logo example used above) or may all be different objects. The rasterized objects may be stored and identified according to any method and type of object and parameter identification known or later developed, such as various known database storage and retrieval techniques, without departing from the spirit or scope of the present invention.

In addition, each presentation object rasterized and stored is also cached in storage 150 in its original form 430 so that unexpected variations and combinations of presentation parameters may be accounted for by rasterizing at print time. This may occur, for example, when an object is re-sized on the fly due to variable text or other placement and size issues. Original form objects 430, 430' and 430" are shown here for the case where the three objects of FIG. 3 are all different objects. In the event the three preRIP commands of the example in FIG. 3 represent three different sets of parameters for one object, only one original form object 430 would be cached in storage 150.

Figure 5:
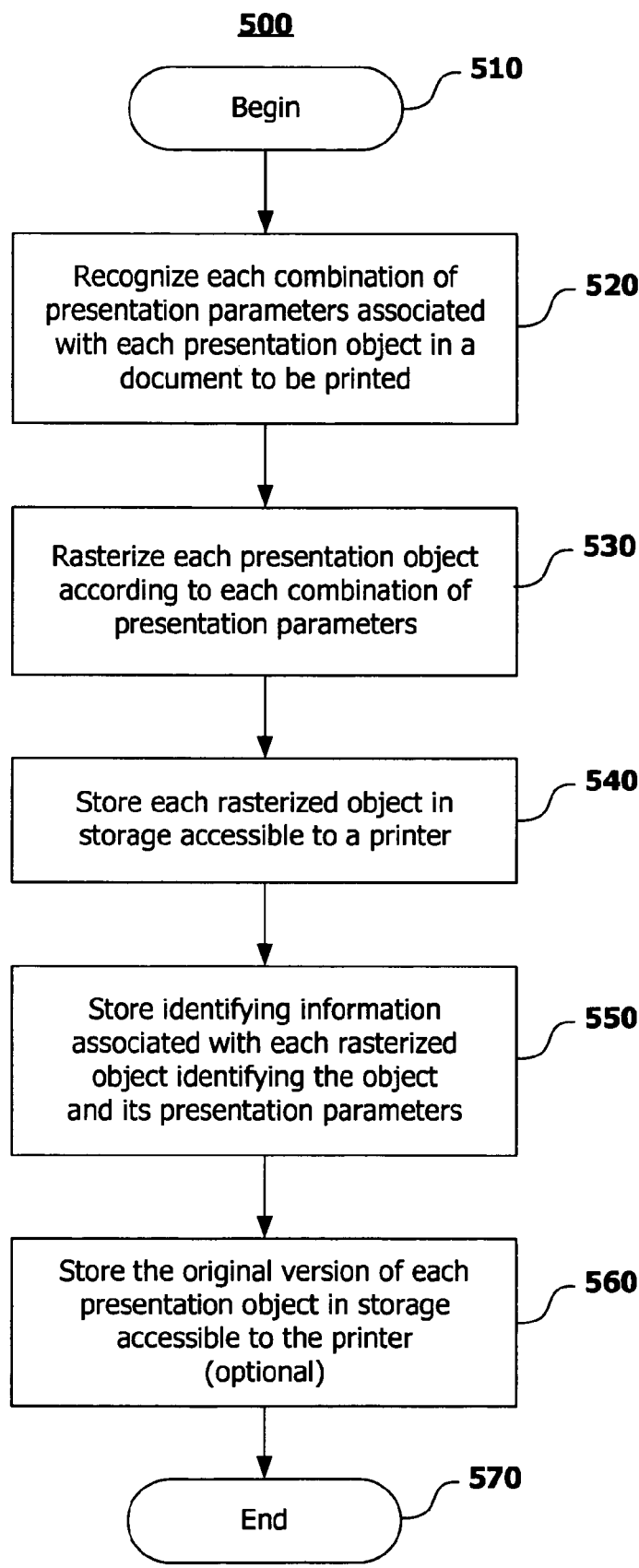
FIG. 5 is a flow diagram illustrating a process for pre-rasterizing presentation objects according to embodiments of the present invention.

An aspect of embodiments of the present invention includes a method of pre-processing the presentation objects present in a print job to speed the print time of the job. Referring now to FIG. 5, a process 500 according to embodiments of the present invention begins at 510 and proceeds to 520 where the presentation objects to be included in a print job are recognized. Also recognized at 520 are the sets of presentation parameters associated with each appearance of each presentation object in the print job. At 530, each presentation object is rasterized according to each set of presentation parameters applicable to the object. Each rasterized object is then stored 540 in storage accessible to the printer so that the printer may utilize the pre-rasterized object at print time. In order to allow the printer to find the appropriate pre-rasterized object, information is associated with each pre-rasterized object identifying the object and the parameters used in the rasterization and the identifying information is stored 550 along with the object.

In order to allow print-time adjustment and rasterization, an original version of each presentation object may also be stored 560 accessibly to the printer. This allows for real-time rasterization where necessary and may save time during printing if the same object is rasterized more than once. The process ends at 570.

After the preRIP commands have been processed by the printer for a given document, the remainder of the print data may be received for processing. As mentioned above, the print data may immediately follow the preRIP commands in the same data stream or may come some time later. As the print data is received from a print server, pages are processed as they come into the printer in accordance with well known methods. The page data will include INCLUDE commands (or their equivalent), each requesting the insertion of a presentation object. As is well known in the art, these INCLUDE commands specify the object and the combination of presentation parameters to be used with that instance of the object. When operating in accordance with embodiments of the present invention, the printer 130 then searches the cache 150 for a pre-rasterized version of that object matching the given combination of presentation parameters. If it is found, it is inserted in the document and processing continues. This is significantly faster than rasterizing and adjusting the object in real time as it is encountered in the print stream. Additional time savings is realized if an object is included within a document more than once with the same combination of presentation parameters, as it can be inserted multiple times after having been rasterized only once. The printer 130 may use any suitable method of searching the stored rasterized objects for a match of object identifier and parameter list, including various known hashing and database methods of storage and retrieval.

Figure 6:
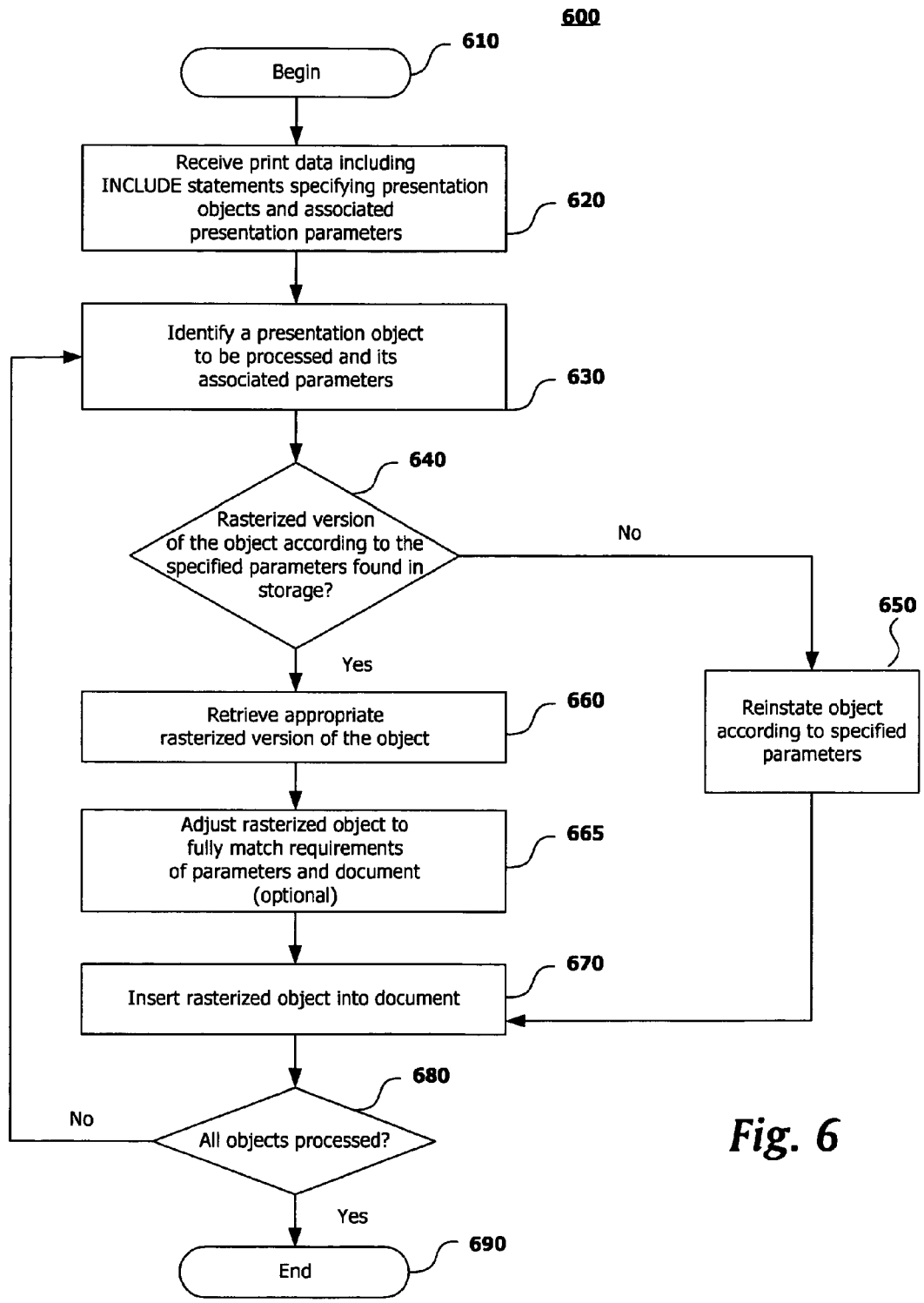
FIG. 6 is a flow diagram illustrating a process for processing print data in accordance with embodiments of the present invention.

Referring now to FIG. 6, a process 600 for handling print data according to embodiments of the present invention is illustrated. The process 600 begins 610 and includes receiving 620 print data including at least one INCLUDE statement (or the equivalent) specifying a presentation object and its associated parameters. At 630, an individual presentation object is identified, along with its parameters. A printer operating in accordance with embodiments of the present invention searches 640 the available local storage 150 for a pre-rasterized version of the specified object with the same associated parameters. If no match is found, the object is rasterized 650 in accordance with the associated presentation parameters (the data representing the object in its original form may be contained within the print job data stream or may be stored accessibly to the printer, as discussed above) as print processing typically proceeds today. If a match is found, the appropriate rasterized version of the object is retrieved 660. In any event, the rasterized object is inserted 670 into the document being printed for inclusion in the printed output (not shown).

At 680, it is determined whether all the presentation objects in the print data have been processed. If all the presentation object have been handled, the process ends at 690, otherwise the process continues at 630 with the next presentation object to be included.

In some instances, such as where a document includes variable text or is pulling items of unknown size for printing from a database or the like, it may be impossible for the application to know exactly what parameters should be associated with an object. Sizing and trim parameters may especially be dependent upon where the object ends up being included and how much space is left after the inclusion of variable text. In such a case, the present invention allows the objects to be pre-rasterized and cached according to only a subset of the available parameters—like color and quality choices only, for instance. Or, they can simply be pre-rasterized at the full 'object presentation space' size. Then, as the document is processed and the object is included, the most efficient pre-rasterized version may be retrieved and trimmed on-the-fly (or rotated, etc.) as needed—once the target space is known. In this mode of operation, some time is saved over the prior art implementation because the entire object is pre-rasterized, but print-time performance does degrade somewhat due to the need for trimming on-the-fly.

In an embodiment of the present invention allowing objects to be pre-rasterized according to a subset of the necessary parameters as described above, step 640 of process 600 illustrated in FIG. 6 would be tuned to search storage 150 for the pre-rasterized version of the object in question most closely matching the presentation parameters specified in the print data. Before the insertion of the rasterized object in the document at 670, the process would include a further, optional step 665 where the object would be trimmed-on-the-fly, rotated or otherwise adjusted as needed to fit the real-time formatting of the document.

The present invention is described here generally and with reference to specific implementations thereof. Those skilled in the art will readily recognize that the various components and techniques described herein may be substituted for using any suitable replacement without departing from the spirit and intent of the invention. Although specific terms are used herein in describing the present invention, it is to be understood that the description here given uses such terminology in a generic and descriptive sense only and not for purposes of limitation. As such, it is intended that the following claims be interpreted broadly to embrace all the variations of the preferred embodiments disclosed.

With respect to the functions and processes described and illustrated herein, each may be embodied in electronic circuitry (or hardware) or as a series of computer programming code instructions (or software) implementing the functions or steps described, or as a combination of hardware and software. For example, in this description and in the following claims where the print server 100 (FIG. 1) or the printer 130 (FIG. 1) is said to take some action or perform some function, that action or function may be effected by the execution of software in the memory (not shown) of the print server 100 or printer 130, as is well known by persons skilled in the relevant arts. Such software may be stored on any known or later developed computer-readable media for loading and/or execution by the print server 100 or printer 130. Alternatively, such action or function may be effected by instructions implemented in the circuitry (not shown) of the relevant device, again, using techniques well known by those skilled in the relevant arts.

As readily recognized by those skilled in the art, the exact order of the steps and processes illustrated and discussed herein may be varied in any advantageous manner without deviating from the present invention. Also, where appropriate, steps may be repeated, skipped or combined to better operate in a given environment.

We claim:

1. A method comprising:
   receiving at a printer at least one preRiP command identifying a presentation object to be included in a print job and presentation parameters associated with the object;
   in response to the at least one preRIP command, rasterizing the presentation object according to the presentation parameters and storing the rasterized object in a cache accessible to the printer
   associating with each stored rasterized object an object label identifying the presentation object and a parameter label identifying the parameters used in rasterizing the object;
   receiving at the printer print data specifying at least one presentation object and associated presentation parameters for inclusion in the print job; and in response to said print data, and
   searching the cache for the rasterized object with the object label and the parameter label matching the object and parameters specified by the print data; and
   if a matching rasterized object is found, including said rasterized object in a printed output of the print data, else if no matching rasterized object is found, rasterizing the object according to the specified parameters and including the result in the printed output of the print data.

2. The method of claim 1, further comprising storing an original, un-rasterized version of each presentation object in the cache.

3. The method of claim 1, wherein at least one additional presentation parameter is applied to the matching rasterized object prior to inclusion in the printed output and wherein the method further comprises:
   modifying the matching rasterized object to conform with the at least one additional parameter;
   including the modified matching rasterized object in the printer output; and
   storing the modified matching rasterized object in the cache with a modified parameter label identifying a complete parameter list associated with the modified matching rasterized object.

4. The method of claim 3 wherein the at least one additional presentation parameter comprises: trimming-on-the-fly; rotation; or a combination thereof.

5. The method of claim 1, further comprising:
   receiving at a printer blocked error information identifying at least one type of error to be ignored during the rasterization process; and
   if an unblocked error occurs during the rasterization of the presentation object, aborting the rasterization and storing the original, unrasterized object in the cache for rasterization at a print time.

6. A computer-readable storage media having embodied thereon computer program instructions effective when executing on a printer direct the printer to:
   receive at least one preRIP command identifying a presentation object to be included in a print job and presentation parameters associated with the object; and
   in response to the at least one preRIP command, rasterize the presentation object according to the presentation parameters and store the rasterized object in a cache accessible to the printer; wherein the computer program instructions further direct the printer to:
   associate with each stored rasterized object an object label identifying the presentation object and a parameter label identifying the parameters used in rasterizing the object;
   receive print data specifying at least one presentation object and associated presentation parameters for inclusion in the print job; and
   in response to said print data, search the cache for the rasterized object with the object label and the parameter label matching the object and parameters specified by the print data, wherein, if a matching rasterized object is found, the computer program instructions further direct the printer to include said rasterized object in a printed output of the print data or, if no matching rasterized object is found, rasterize the object according to the specified parameters and include the result in the printed output of the print data.

7. The media of claim 6, further comprising computer program instructions that direct the printer to store an original, un-rasterized version of each presentation object in the cache.

8. The media of claim 6, wherein at least one additional presentation parameter is applied to the matching rasterized object prior to inclusion in the printed output and wherein the media further comprises computer program instructions that direct the printer to:
   modify the matching rasterized object to conform with the at least one additional parameter;
   include the modified matching rasterized object in the printer output; and
   store the modified matching rasterized object in the cache with a modified parameter label identifying a parameter list associated with the modified matching rasterized object.

9. The media of claim 8 wherein the at least one additional presentation parameter comprises: trimming-on-the-fly; rotation; or a combination thereof.

10. The media of claim 6 further comprising computer program instructions that direct the printer to:
   receive blocked error information identifying at least one type of error to be ignored during the rasterization process,
   wherein if an unblocked error occurs during the rasterization of the presentation object, the rasterization is aborted and the original, unrasterized object is stored in the cache for rasterization at a print time.

11. An apparatus comprising:
   a print job pre-processing module for identifying presentation objects in a print job to be pre-processed and at least one combination of presentation parameters associated therewith;
   a pre-rasterization module for rasterizing each presentation object according to the at least one combination of pre-sentation parameters to create a pre-rasterized object;
   an identification module for associating with each pre-rasterized object an object label identifying the object and a parameter label identifying the parameters used in pre-rasterizing the object;
   a local cache accessible to the apparatus and operable to store the pre-rasterized object and the associated object label and parameter label in the local cache, wherein the caching module further stores the original, un-rasterized version of each presentation object in the local cache;
   a print job processing module for identifying the object label and the parameter label associated with at least one presentation object to be included in the print job;
   a cache searching module for searching the local cache for the matching pre-rasterized object with the object label and the parameter label matching the object label and the parameter label of the at least one presentation object to be included; and
   a printing module for including the matching pre-rasterized object in a printed output of the print job.

12. The apparatus of claim 11, further comprising:
   a blocked error module for identifying at least one type of blocked error to be ignored during the pre-rasterization; and
   a print-time rasterization module for rasterizing presentation objects at print time, wherein, if the pre-rasterization module encounters an unblocked error during pre-rasterization the pre-rasterization is aborted and the object is rasterized by the print-time rasterization module at print time.

13. The apparatus of claim 12, wherein the at least one combination of parameters associated with a presentation object comprises a subset of the presentation parameters needed for inclusion of the object in the print job,
   wherein the cache searching module searches for the pre-rasterized object with the object label matching the object label of the presentation object to be included and the parameter label most closely matching the presentation parameters of the presentation object to be included, and
   wherein the print-time rasterization module modifies the pre-rasterized object to conform with at least one additional presentation parameter prior to inclusion by the printing module.

14. A print server comprising:
   at least one application program for creating print jobs including presentation objects having presentation parameters defining applicable formatting;
   a print job processing module for recognizing the presentation objects and each combination of presentation parameters associated with each appearance of each presentation object within the current print job and, for each said combination, creating a preRIP command identifying the presentation object and the associated presentation parameters,
   wherein said preRIP command directs a printer to rasterize the identified presentation object according to the identified combination of parameters and to cache the rasterized object in a local cache for later printing;
   a communication module for communicating with the printer to send each said preRIP command to the printer;
   a cache searching module for searching the local cache for the rasterized presentation object matching the presentation parameters of at least one presentation object to be included in the print job; and
   a printing module for including the matching rasterized presentation object in a printed output of the print job.

15. The print server of claim 14, wherein said communication module further sends blocked error information to the printer indicating at least one type of error to be ignored during the rasterization process.

16. The print server of claim 14 wherein the combination of presentation parameters identified in the preRIP command comprises a subset of the presentation parameters needed for inclusion of the object in the print job.

17. A printer comprising:
   a communication module for receiving at least one preRIP command identifying a presentation object to be included in a print job and presentation parameters associated with the object;
   a cache storage accessible to the printer;
   a rasterization module for, in response to the at least one preRIP command, rasterizing the presentation object according to the presentation parameters; and
   a storage module for storing the rasterized object and the original, un-rasterized version of the object in the cache,
   wherein the storage module further associates with each stored rasterized object an object label identifying the presentation object and a parameter label identifying the parameters used in rasterizing the object,
   wherein the communication module further receives print data specifying at least one presentation object and associated presentation parameters for inclusion in the print job, and
   wherein the printer further comprises:
   a cache searching module for, in response to receiving said print data, searching the cache for the matching rasterized object with the object label and the parameter label matching the object label and the parameter label of the at least one presentation object to be included in the print job; and a printing module for, if a matching rasterized object is found, including the matching rasterized object in a printed output of the print job and, if no matching rasterized object is found, rasterizing the object according to the specified parameters and including the result in the printed output of the print data.

18. The printer of claim 17, wherein at least one additional presentation parameter is applied to the matching rasterized object prior to inclusion in the printed output and wherein the printing module further modifies the matching rasterized object to conform with the at least one additional parameter and includes the modified matching rasterized object in the printed output, wherein the storage module further stores the modified matching rasterized object in the cache with a modified parameter label identifying a complete parameter list associated with the modified matching rasterized object.

19. The printer of claim 18 wherein the at least one additional presentation parameter comprises: trimming-on-the-fly; rotation; or a combination thereof.

20. The printer of claim 17, wherein the communication module further receives blocked error information identifying at least one type of error to be ignored during the rasterization process, and wherein, if the rasterization module detects an unblocked error during the rasterization of the presentation object, the rasterization is aborted.

* * * * *

UNITED STATES PATENT AND TRADEMARK OFFICE
CERTIFICATE OF CORRECTION

PATENT NO. : 7,990,577 B2
APPLICATION NO. : 12/621651
DATED : August 2, 2011
INVENTOR(S) : Aschenbrenner et al.

It is certified that error appears in the above-identified patent and that said Letters Patent is hereby corrected as shown below:

The text in column 7 line 56 should read
--1. A method comprising:
    receiving at a printer at least one preRiP command identifying a presentation object to be included in a print job and presentation parameters associated with the object;
    in response to the at least one preRIP command, rasterizing the presentation object according to the presentation parameters and storing the rasterized object in a cache accessible to the printer;
    associating with each stored rasterized object an object label identifying the presentation object and a parameter label identifying the parameters used in rasterizing the object;
    receiving at the printer print data specifying at least one presentation object and associated presentation parameters for inclusion in the print job;
    and in response to said print data;
    searching the cache for the rasterized object with the object label and the parameter label matching the object and parameters specified by the print data; and
    if a matching rasterized object is found, including said rasterized object in a printed output of the print data, else if no matching rasterized object is found, rasterizing the object according to the specified parameters and including the result in the printed output of the print data.--

The text in column 8 line 33 should read
--5. The method of claim 1, further comprising:
    receiving at the printer blocked error information identifying at least one type of error to be ignored during the rasterization process; and
    if an unblocked error occurs during the rasterization of the presentation object, aborting the rasterization and storing the original, unrasterized object in the cache for rasterization at print time.--

The text in column 9 line 22 should read
--10. The media of claim 6 further comprising computer program instructions that direct the printer to:
    receive blocked error information identifying at least one type of error to be ignored during the rasterization process,
    wherein if an unblocked error occurs during the rasterization of the presentation object, the Signed and Sealed this
Twenty-eighth Day of February, 2012

David J. Kappos
*Director of the United States Patent and Trademark Office* rasterization is aborted and the original, unrasterized object is stored in the cache for rasterization at print time.--